United States Patent
Cho et al.

(10) Patent No.: US 9,226,632 B2
(45) Date of Patent: *Jan. 5, 2016

(54) ROBOT CLEANER, CONTROLLING METHOD OF THE SAME, AND ROBOT CLEANING SYSTEM

(71) Applicant: LG Electronics Inc., Seoul (KR)

(72) Inventors: Ilsoo Cho, Seoul (KR); Taebum Kwon, Seoul (KR); Suuk Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,135

(22) Filed: Feb. 3, 2015

(65) Prior Publication Data

US 2015/0148959 A1 May 28, 2015

Related U.S. Application Data

(63) Continuation of application No. 13/905,898, filed on May 30, 2013.

(30) Foreign Application Priority Data

Jun. 8, 2012 (KR) .................. 10-2012-0061754

(51) Int. Cl.
  *G05B 19/18* (2006.01)
  *A47L 9/28* (2006.01)
  *G05D 1/00* (2006.01)
  (Continued)

(52) U.S. Cl.
  CPC ............ *A47L 9/2805* (2013.01); *A47L 9/2852* (2013.01); *A47L 9/2894* (2013.01); *B25J 11/0085* (2013.01); *G05D 1/0011* (2013.01); *G05D 1/0221* (2013.01); *G05D 1/0238* (2013.01); *G05D 1/0246* (2013.01);
  (Continued)

(58) Field of Classification Search
  CPC .......... A47L 9/2805; A47L 9/00; G05D 1/00; G05D 1/0011
  USPC ................. 701/1, 2, 22, 23–28, 36, 400, 450; 700/3, 9, 13–22, 28–30, 56–66, 700/245–262, 302, 303, 304, 306; 15/3, 15/319; 901/1; 134/18
  See application file for complete search history.

(56) References Cited

U.S. PATENT DOCUMENTS

| 5,032,775 A | 7/1991 | Mizuno et al. |
| 6,574,536 B1 | 6/2003 | Kawagoe et al. |

(Continued)

FOREIGN PATENT DOCUMENTS

| CN | 102065738 A | 5/2011 |
| EP | 2294960 A2 | 3/2011 |
| EP | 2407847 A2 | 1/2012 |

*Primary Examiner* — Thomas Tarcza
*Assistant Examiner* — Tyler J Lee
(74) *Attorney, Agent, or Firm* — Dentons US LLP

(57) ABSTRACT

Disclosed are a robot cleaner, a controlling method of the same, and a robot cleaning system. The robot cleaner can perform a cleaning operation with respect to only a user's desired region, in a repeated and concentrated manner. Further, as the robot cleaner runs on a user's desired region in a manual manner, a designated region can be precisely set. Further, as the robot cleaner performs a cleaning operation by setting a user's desired region, only a simple configuration is added to a terminal device such as a remote control unit. Accordingly, additional costs can be reduced, and a malfunction can be prevented.

20 Claims, 15 Drawing Sheets

(51) Int. Cl.
  *G05D 1/02* (2006.01)
  *B25J 11/00* (2006.01)
(52) U.S. Cl.
  CPC .......... *G05D 1/0274* (2013.01); *A47L 2201/04* (2013.01); *G05D 2201/0203* (2013.01); *Y10S 901/01* (2013.01)

(56) References Cited

U.S. PATENT DOCUMENTS

| | | |
|---|---|---|
| 7,085,624 B2 | 8/2006 | Aldred et al. |
| 7,173,391 B2 | 2/2007 | Jones et al. |
| 7,324,870 B2 | 1/2008 | Lee |
| 7,663,333 B2 | 2/2010 | Jones et al. |
| 7,805,220 B2 | 9/2010 | Taylor et al. |
| 8,396,592 B2 | 3/2013 | Jones et al. |
| 8,452,450 B2 | 5/2013 | Dooley et al. |
| 8,463,438 B2 | 6/2013 | Jones et al. |
| 8,712,588 B2 | 4/2014 | Myeong et al. |
| 2004/0211444 A1 | 10/2004 | Taylor et al. |
| 2005/0010331 A1 | 1/2005 | Taylor et al. |
| 2005/0187678 A1 | 8/2005 | Myeong et al. |
| 2005/0273967 A1 | 12/2005 | Taylor et al. |
| 2006/0020369 A1 | 1/2006 | Taylor et al. |
| 2006/0241814 A1 | 10/2006 | Jung |
| 2008/0184518 A1 | 8/2008 | Taylor et al. |
| 2010/0049365 A1 | 2/2010 | Jones et al. |
| 2010/0228394 A1 | 9/2010 | Yi et al. |
| 2010/0292839 A1 | 11/2010 | Hong et al. |

ROBOT CLEANER, CONTROLLING METHOD OF THE SAME, AND ROBOT CLEANING SYSTEM

CROSS-REFERENCE TO RELATED APPLICATION

This application is a continuation application of 13/905,898, filed May 30, 2013; which claims the benefit of Korean Patent Application No. 10-2012-0061754 filed on Jun. 8, 2012, all the applications which are incorporated herein by reference in its entirety.

BACKGROUND OF THE DISCLOSURE

1. Field of the Disclosure

The present disclosure relates to a robot cleaner, and particularly, to a robot cleaner capable of performing a cleaning operation with respect to a user's desired region.

2. Background of the Disclosure

Generally, a robot has been developed for an industrial use, and has managed some parts of factory automation. As the robot is applied to various fields recently, medical robots, space robots, home robots, etc. are being developed.

A representative of the home robot is a robot cleaner, a kind of home electronic appliance capable of performing a cleaning operation by sucking peripheral dust or foreign materials with autonomously moving on a predetermined region. This robot cleaner is provided with a chargeable battery, and is provided with an obstacle sensor for avoiding an obstacle while moving. Further, robot cleaners, capable of performing a self position recognition function and a map creating function using cameras or various types of sensors, are being developed.

When a robot cleaner performs a cleaning operation with respect to a large space, the following problems may occur. First of all, it takes a lot of time to perform the cleaning operation. Further, some regions may not be cleaned to result in lowering of cleaning efficiency. In this case, a user may reduce a cleaning time by firstly cleaning some regions, or by repeatedly cleaning only some regions.

In the conventional robot cleaner, as shown in the following precedent patent documents 1 and 2, a user positions a robot cleaner below a position recognition mark installed on the ceiling within an operation region. Then, if the user controls the robot cleaner to remember an identification number of each room, the robot cleaner can distinguish a plurality of operation regions from each other. However, in this case, the following problems may occur. Firstly, in order to set a position of a specific region, the user should mount the position recognition mark on the ceiling. Further, a recognition function by the robot cleaner may be degraded as dust or foreign materials cling to the position recognition mark.

In the conventional robot cleaner, as shown in the following precedent patent document 3, light is emitted from a laser point of a remote controller so that a specific region can be cleaned. Then the emitted light is reflected with a value. Based on the value, a position of the robot cleaner can be detected. However, in this case, it is difficult to detect a precise position according to a form of a bottom floor. Further, in a case where a specific region is set by the laser point of the remote control unit, there may be some points within the region, on which the robot cleaner can not move.

SUMMARY OF THE DISCLOSURE

Therefore, an aspect of the detailed description is to provide a robot cleaner capable of performing a cleaning operation by setting a desired region without using the conventional position recognition mark or the conventional laser point of a remote control unit, and a controlling method of the same.

Another aspect of the detailed description is to provide a robot cleaner capable of performing a cleaning operation with respect to only a user's desired region, in a repeated and concentrated manner, a controlling method of the same, and a robot cleaning system.

To achieve these and other advantages and in accordance with the purpose of this specification, as embodied and broadly described herein, there is provided a robot cleaner, comprising: a driving unit configured to move the robot cleaner; a region setting module configured to set a designated region within a cleaning region, by operating the driving unit according to a designated region setting command; a control unit configured to perform a cleaning operation with respect to the designated region, according to a cleaning command; and a cleaning unit configured to suck dust or foreign materials within the cleaning region or the designated region, according to the cleaning command.

According to another aspect of the present invention, there is provided a robot cleaner, comprising: a driving unit configured to move the robot cleaner; a region setting module configured to set a designated region within a cleaning region, by operating the driving unit according to a designated region setting command; a control unit configured to perform a cleaning operation with respect to the designated region, according to a cleaning command; a cleaning unit configured to suck dust or foreign materials within the cleaning region or the designated region, according to the cleaning command; and a communication unit configured to receive a remote control signal from an external device, wherein the control unit further comprises a command extraction module configured to extract, from the remote control signal, a control command including the designated region setting command and the cleaning command.

To achieve these and other advantages and in accordance with the purpose of this specification, as embodied and broadly described herein, there is also provided a robot cleaning system, comprising: a robot cleaner provided with a designated region cleaning mode, and configured to set a designated region within a cleaning region based on a designated region setting command, and to perform a cleaning operation with respect to the designated region based on a cleaning command; and a terminal device configured to receive the designated region setting command according to the designated region cleaning mode or the cleaning command, and then to transmit the command to the robot cleaner.

The terminal device may comprise an input unit configured to receive the designated region setting command and the cleaning command; a control unit configured to generate a remote control signal according to the designated region cleaning mode, in accordance with a communication protocol with the robot cleaner; and a communication unit configured to transmit the remote control signal to the robot cleaner.

To achieve these and other advantages and in accordance with the purpose of this specification, as embodied and broadly described herein, there is still also provided a method for controlling a robot cleaner, comprising: receiving a designated region setting command; running on a cleaning region according to the designated region setting command; setting a designated region within the cleaning region; and performing a cleaning operation with respect to the designated region, according to a cleaning command.

According to another aspect of the present invention, there is provided a method for controlling a robot cleaner, comprising: receiving a remote control signal from an external device;

extracting, from the remote control signal, a control command including a designated region setting command and a cleaning command; receiving a designated region setting command; running on a cleaning region according to the designated region setting command; setting a designated region within the cleaning region; and performing a cleaning operation with respect to the designated region, according to a cleaning command.

The present invention can have the following advantages.

Firstly, the robot cleaner can perform a cleaning operation with respect to only a user's desired region, in a repeated and concentrated manner, without using the conventional position recognition mark or the conventional laser point of a remote control unit. As an additional position recognition mark is not required, additional costs can be reduced, and a malfunction of the laser point can be prevented.

Secondly, as the robot cleaner runs on a user's desired region in a manual manner, a designated region can be precisely set. Further, as the designated region is cleaned in a repeated and concentrated manner, cleaning efficiency and a user's convenience can be enhanced.

Thirdly, as the robot cleaner performs a cleaning operation by setting a user's desired region, only a simple configuration is added to a terminal device such as a remote control unit. Accordingly, additional costs can be reduced, and a malfunction can be prevented.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 5:
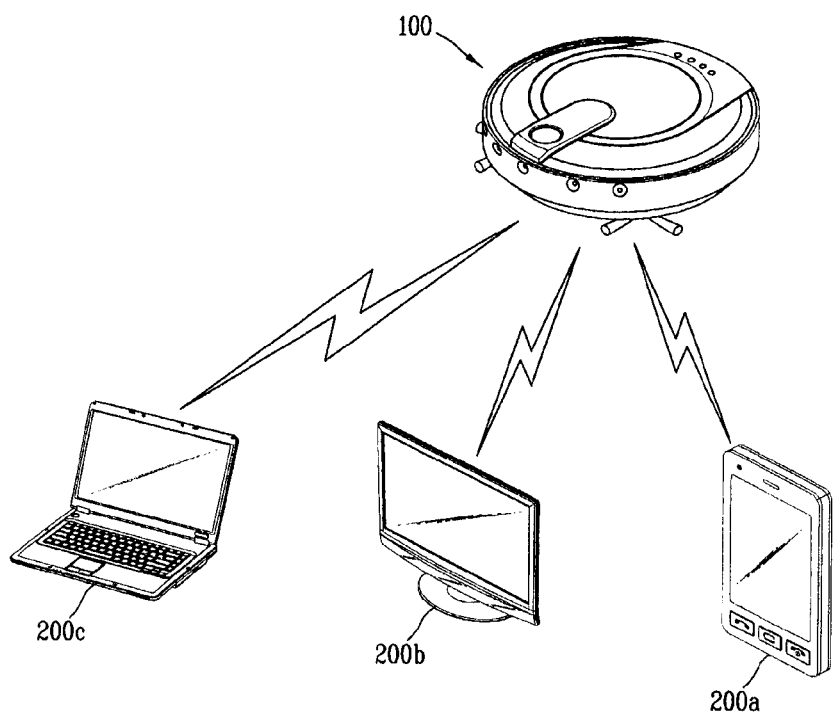
FIG. 5 is a view schematically illustrating a configuration of a robot cleaning system according to an embodiment of the present invention.

Referring to FIG. 5, a robot cleaning system according to an embodiment comprises a robot cleaner 100 and a terminal device 200. The robot cleaner 100 is provided with a designated region cleaning mode, and is configured to set a designated region within a cleaning region based on a designated region setting command, and to perform a cleaning operation with respect to the designated region based on a cleaning command. Terminal devices 200a, 200b and 200c are configured to receive the designated region setting command according to the designated region cleaning mode, or the cleaning command, and then to transmit the command to the robot cleaner.

Figure 7:
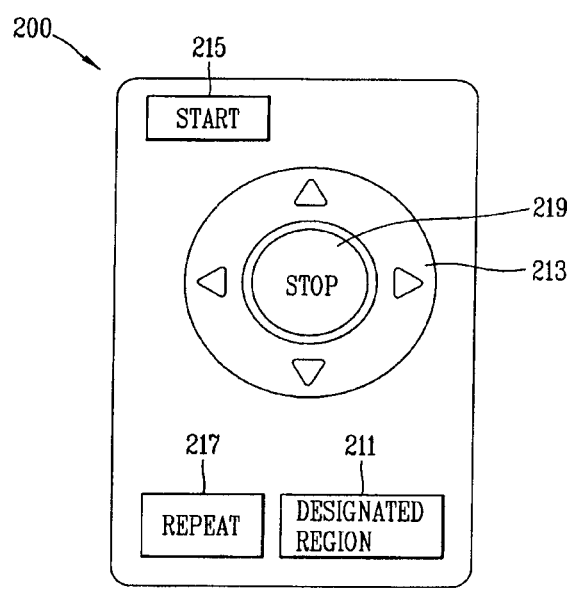
FIG. 7 is a view illustrating an appearance of a terminal device according to an embodiment of the present invention.

Generally, a terminal device is categorized into a mobile/portable terminal and a stationary terminal according to a movable state. In the present invention, the terminal device includes the mobile terminal and the stationary terminal. Also, the terminal is categorized into a handheld terminal and a vehicle mount terminal according to a user's portable state. For instance, the terminal device includes a cell-phone (PCS phone), a smart phone, a notebook (laptop computer), a digital broadcasting terminal, Personal Digital Assistants (PDA), a Portable Multimedia Player (PMP), a navigation system, etc. A robot cleaning system may have a different network scheme according to a type of the terminal device. For instance, in case of a cell-phone or a smart phone, the robot cleaning system may use a mobile communication network such as 3G, CDMA and WCDMA. In this case, the robot cleaner and the terminal device transmit or receive radio signals to/from a base station, an external terminal device, a server, etc. on a mobile communication network. As shown in FIG. 7, the terminal device 200 may be a remote control unit of a simple form. The remote control unit is configured to transmit/receive signals to/from the robot cleaner using an infrared ray communication.

Figure 6:
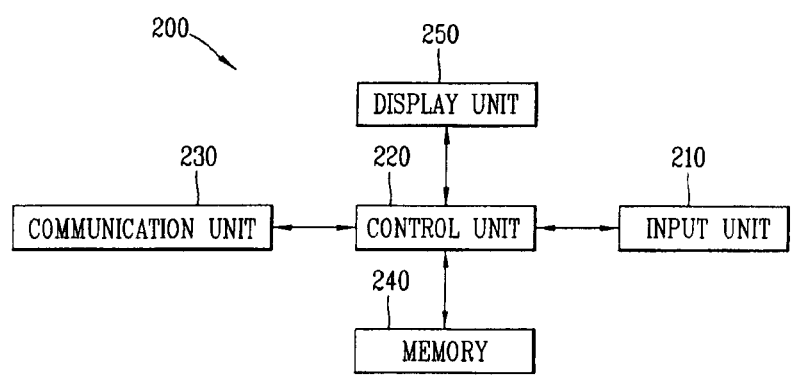
FIG. 6 is a block diagram schematically illustrating a configuration of a terminal device according to an embodiment of the present invention.

Referring to FIG. 6, the terminal device 200 comprises an input unit 210 configured to receive the designated region setting command and the cleaning command; a control unit 220 configured to generate a remote control signal according to the designated region cleaning mode, in accordance with a communication protocol with the robot cleaner; and a communication unit 230 configured to transmit the remote control signal to the robot cleaner.

Referring to FIG. 7, the input unit 210 is provided with one or more buttons. The input unit 210 comprises a designated region button 211 for making the robot cleaner enter the designated region cleaning mode, one or more directional buttons 213 for driving the robot cleaner so that the robot cleaner can set the designated region, and a start button 215 for inputting an operation start command. The input unit 210 may further comprise a stop button 217 for stopping the robot cleaner after the robot cleaner sets the designated region. The stop button 217 may also serve as a cleaning stop command for stopping the robot cleaner during a cleaning operation, or a cleaning end command.

The communication unit 230 transmits, to the robot cleaner 100, a remote control signal generated by the control unit 220, and receives, from the robot cleaner 100, one or more data including image information or a cleaning map. Said one or more data indicates image information, obstacle information, position information, a cleaning map, a cleaning region, state information, etc. The control unit 220 generates a remote control signal according to a user's command. The control command includes a cleaning start command or a cleaning stop command. Further, the control command includes a designated region setting command and a cleaning command for cleaning a designated region.

For instance, if a user presses the designated region button 211 of FIG. 7, the control unit 220 converts a designated region setting command into a remote control signal. Then the control unit 230 transmits the remote control signal to the robot cleaner. Once the designated region setting command is input, the robot cleaner may initialize the existing map information. Once a user presses the directional buttons 213 after pressing the designated region button 211, the control unit 220 continues to generate remote control signals and transmit the signals to the robot cleaner. Then the robot cleaner sets a designated region while running on a cleaning region, according to the remote control signals.

The terminal device may further comprise a memory 240. The memory 240 may store therein programs for driving the control unit 220. The memory 240 may store therein data to be input/output. The memory 240 may store therein, in a pattern manner, remote control signals for controlling the robot cleaner, and control commands corresponding to the remote control signals.

The display unit 250 displays information processed by the terminal device. That is, the display unit 250 displays a control screen. The display unit 250 may display various types of information received from the robot cleaner, or various types of control commands input by a user, etc. The display unit 250 may include at least one of a Liquid Crystal Display (LCD), a Thin Film Transistor-LCD (TFT-LCD), an Organic Light Emitting Diode (OLED) display, a flexible display and a three-dimensional (3D) display. The display unit 250 may be provided with various types of buttons of the input unit in an icon manner.

Figure 1:
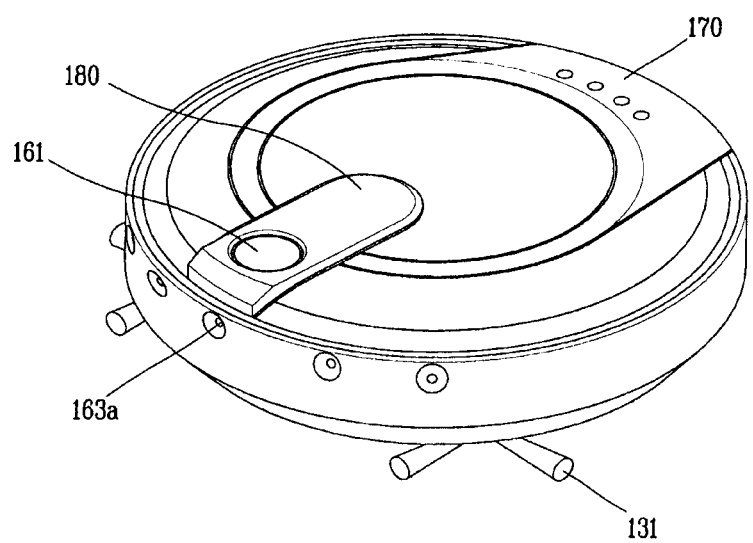
FIG. 1 is a perspective view illustrating an appearance of a robot cleaner according to preferred embodiments of the present invention.
Figure 2:
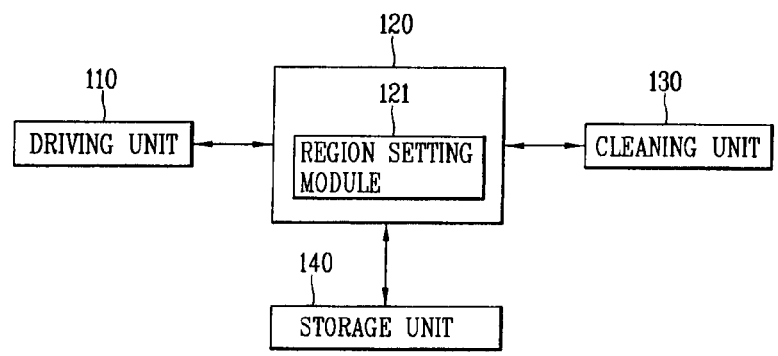
FIGS. 2 to 4 are block diagrams illustrating a detailed configuration of a robot cleaner according to preferred embodiments of the present invention.

Referring to FIGS. 1 and 2, the robot cleaner according to one embodiment comprises a driving unit 110 for moving the robot cleaner, a control unit 120 and a cleaning unit 130.

The robot cleaner is provided with right and left main wheels at two lower sides thereof. A handgrip may be installed at two side surfaces of the wheels, for facilitation of a user's grasp. The driving unit 110 is provided with wheel motors connected to the right and left main wheels, and configured to move the robot cleaner by driving the wheel motors. The wheel motors are connected to the main wheels, respectively thus to rotate the main wheels, and can be rotated in two directions in an independent manner. And the robot cleaner is provided with one or more auxiliary wheels on the rear surface thereof. The auxiliary wheels serve to support a body of the robot cleaner, to minimize friction between a lower surface of the body and the bottom surface (surface to be cleaned), and to allow the robot cleaner to smoothly move.

The cleaning unit 130 is configured to suck dust or foreign materials within a cleaning region or a designated region according to a cleaning command. The cleaning unit 130 comprises a dust box configured to store therein collected dust particles, a suction fan configured to provide a driving power to suck dust within a cleaning region, and a suction motor configured to suck air by rotating the suction fan. Referring to FIG. 1, the cleaning unit 130 further includes an agitator 131 rotatably mounted to a lower part of the body of the robot cleaner, and a side brush configured to clean a corner or an edge of a wall, etc. with rotating centering around a vertical shaft of the body. The agitator 131 makes dust particles on the floor or a carpet move to the air with rotating centering around a horizontal shaft of the body of the robot cleaner. A plurality of blades are provided on an outer circumferential surface of the agitator 131 in a spiral form. A brush may be provided between the blades.

The control unit 120 comprises a region setting module 121 configured to set a designated region within a cleaning region by operating the driving unit 110 according to a designated region setting command. Once a user inputs a designated region setting command to the robot cleaner, the control unit sets a designated region while running on a cleaning region, according to the designated region setting command. The designated region setting command comprises a designated region setting start command, a designated region setting completion command, a running command for a designated region setting, etc.

The control unit 120 is configured to perform a cleaning operation with respect to a designated region according to a cleaning command. That is, once a cleaning command is input, the control unit starts to perform a cleaning operation with respect to a cleaning region or a designated region, using the cleaning unit such as the suction fan and the suction motor. The cleaning command comprises a cleaning start command, a cleaning stop command, etc. The cleaning command further comprises one or more information among a cleaning type, the number of times of cleaning, whether to repeatedly perform a cleaning operation or not, and a cleaning start time.

The robot cleaner further comprises a storage unit 140 configured to store therein at least one of image information, obstacle information, position information, a cleaning map and a cleaning region. The storage unit 140 is configured to store therein a control program for controlling the robot cleaner, and data associated with the control program. The storage unit 140 may further store therein a cleaning type and a running type. As the storage unit 140, a non-volatile memory (NVM, NVRAM) is mainly used. The NVM indicates a storage device capable of maintaining stored information even if power is not supplied thereto. The NVM includes a ROM, a flash memory, a magnetic computer memory device (e.g., a hard disk, a diskette drive, and a magnetic tape), an optical drive, a magnetic RAM, a PRAM, etc.

Figure 3:
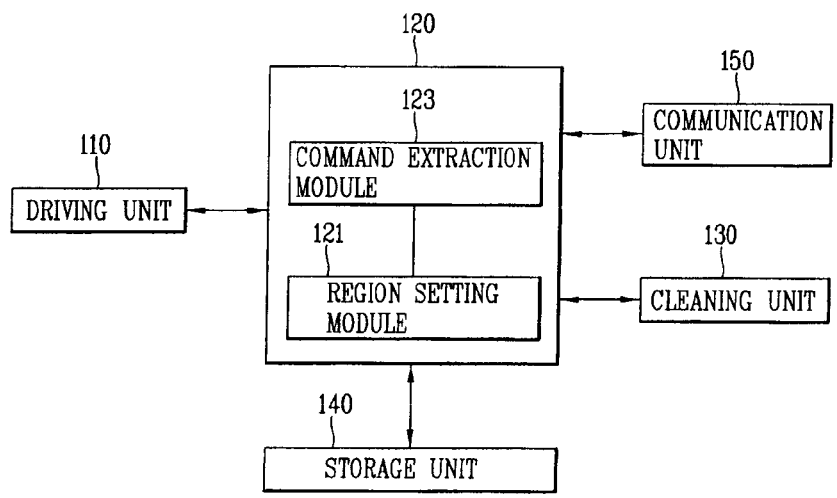

Referring to FIGS. 1 and 3, a robot cleaner according to another embodiment of the present invention comprises a driving unit 110 configured to move the robot cleaner; a region setting module 121 configured to set a designated region within a cleaning region, by operating the driving unit according to a designated region setting command; a control unit 120 configured to perform a cleaning operation with respect to the designated region, according to a cleaning command; a cleaning unit 130 configured to suck dust or foreign materials within the cleaning region or the designated region, according to the cleaning command; and a communication unit 150 configured to receive a remote control signal from an external device. Explanations about the driving unit 110, the cleaning unit 130 and the storage unit 140 will be omitted, since they have been already explained in the aforementioned embodiment.

The communication unit 150 receives a remote control signal from an external terminal device, and transmits a response signal to the remote control signal, i.e., one or more data, to the external terminal device. The control unit 120 controls the robot cleaner according to a remote control signal, and generates a response signal according to a control result. The control unit 120 further comprises a command extraction module 123 configured to extract, from a remote control signal, a control command including a designated region setting command and a cleaning command.

The communication unit 150 is connected to the terminal device through a communication method among currently-available communication methods including a wired communication method, a radio communication method and a satellite communication method, thereby exchanging signals and data with the terminal device. The communication unit 150 receives a remote control signal from the terminal device, and transmits state information of the robot cleaner, obstacle information, position information, image information, a cleaning map, etc. to the terminal device. Furthermore, the communication unit 150 may perform communication with the terminal device, using one of short-range radio communications including a radio frequency (RF) communication, Bluetooth, an infrared ray communication (IrDA), a wireless LAN, zigbee, etc. For instance, if the terminal device is a smart phone, the robot cleaner may be further provided with a communication unit according to a communication method which can be used by the smart phone. The communication unit 150 receives, from the terminal device 200, cleaning reservation information of the robot cleaner. The control unit 120 performs a cleaning operation based on the cleaning reservation information.

In a case where the robot cleaning system is provided with the terminal device of FIG. 7, the communication unit transmits/receives signals to/from the terminal device, using an infrared ray communication method, etc. Once a user presses the designated region button 211, the terminal device generates a remote control signal according to a designated region setting command, and transmits the remote control signal to the communication unit. Then the communication unit transmits the received remote control signal to the control unit. The command extraction module 123 extracts the designated region setting command from the remote control signal. The control unit 120 may delete information on a cleaning type and a cleaning region, by resetting the storage unit 140. In this case, the storage unit 140 may backup information prior to execution of the designated region setting command.

The region setting module 121 sets a designated region based on a running path after receiving the designated region setting command. For instance, if a user presses the designated region button 211 of the terminal device shown in FIG. 7, the terminal device transmits a designated region setting command to the robot cleaner. The control unit stops the current command, according to the designated region setting command. Then if the user presses the directional button 213, the control unit controls the robot cleaner to run by operating the driving unit, and generates a running path. Hereinafter, an operation to set a designated region and perform a cleaning operation by the robot cleaner, will be explained with reference to FIGS. 8A to 13.

Figure 8A:
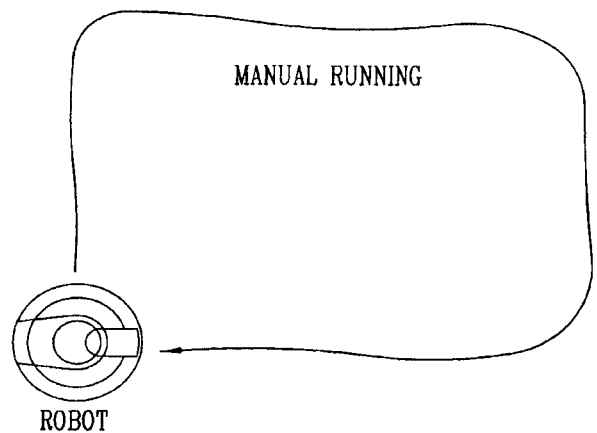
FIGS. 8A to 8E are views illustrating one example of an operation to set a designated region according to preferred embodiments of the present invention.
Figure 8B:
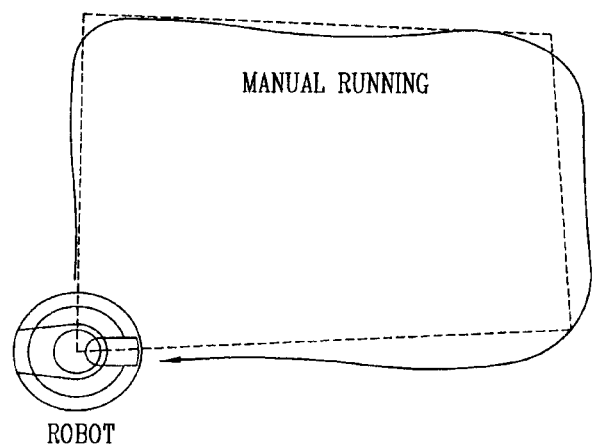
Figure 8C:
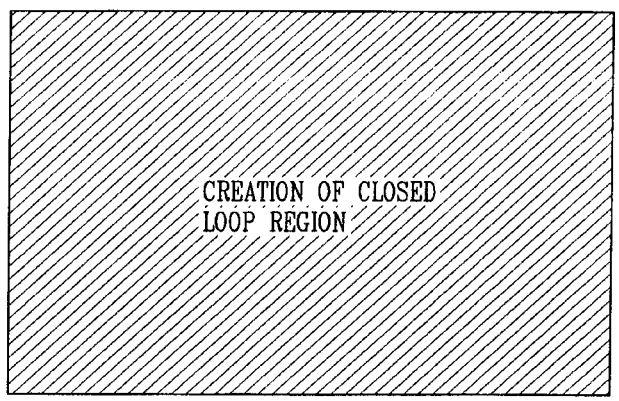
Figure 8D:
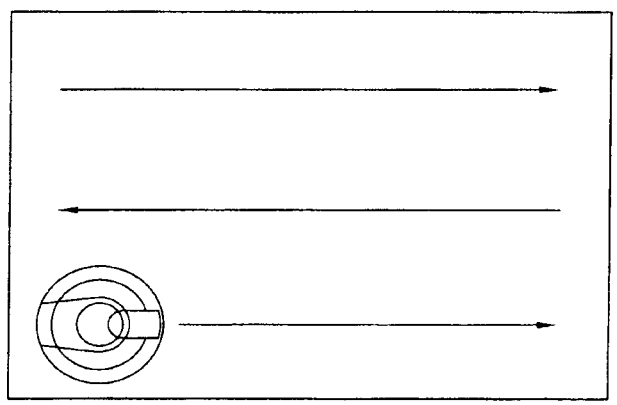
Figure 8E:
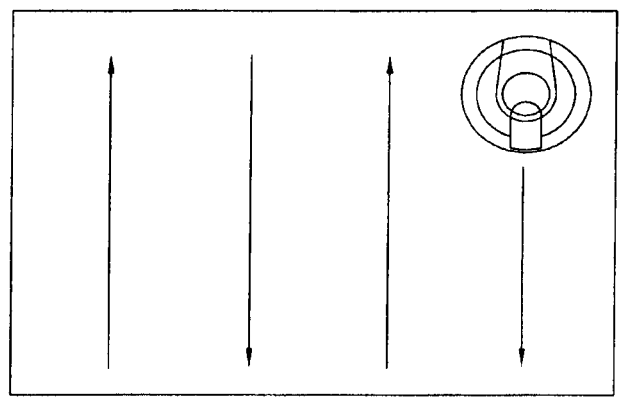

FIGS. 8A to 8E and 9 are views illustrating an example to set a designated region, in which a running path of the robot cleaner is implemented as a closed loop. If a user presses the directional button to drive the robot cleaner in a manual manner, the robot cleaner sets a running path as shown in FIG. 8A. Referring to FIG. 8B, the region setting module 121 approximates a running path according to a designated region setting command input by the user. Referring to FIG. 8C, the region setting module 121 may set a rectangular designated region, using maximum values and minimum values in a vertical direction and a horizontal direction of the running path. Then the control unit performs a cleaning operation with respect to the designated region. That is, if a user presses the start button 215 of the terminal device shown in FIG. 7 after a designated region is set, the control unit performs a cleaning operation with respect to the set designated region as shown in FIGS. 8D and 8E. Preferably, the robot cleaner moves with a width corresponding to its radius. FIGS. 8D and 8E illustrate an example of a cleaning type. The robot cleaner may adopt a random type, a spiral type, and so on, as well as a zigzag type. In case of the zigzag type, the robot cleaner may firstly perform a zigzag cleaning in a horizontal direction (long-axis) within a closed loop as shown in FIG. 8D. Then the robot cleaner may perform a zigzag cleaning in a vertical direction (short-axis) as shown in FIG. 8E. However, the robot cleaner may perform a zigzag cleaning in other manner.

Figure 9:
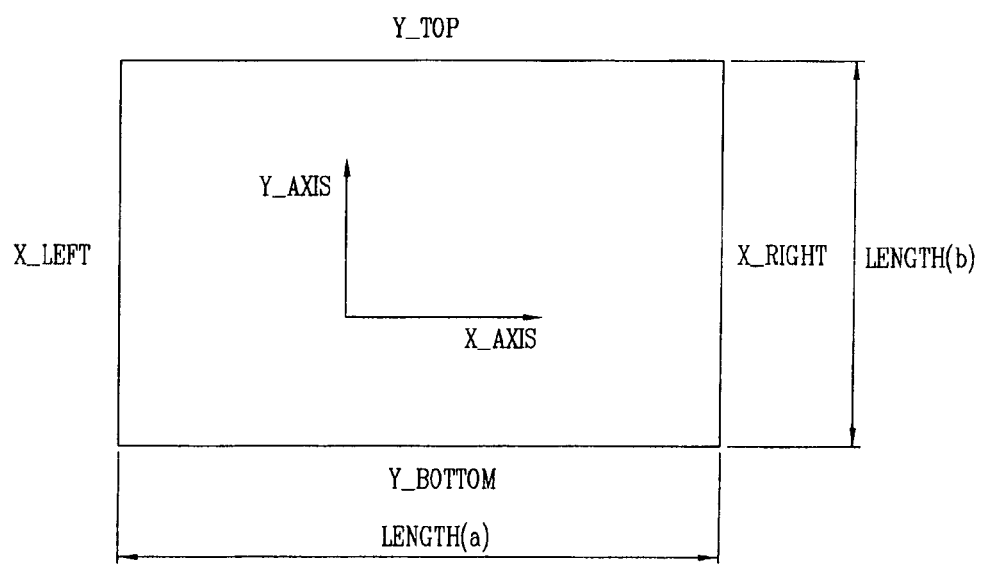
FIG. 9 is a view illustrating an operation to create a rectangular closed loop shown in FIGS. 8A to 8E.

FIG. 9 is a view illustrating an example to set a designated region of a rectangular shape. As shown in FIG. 9, the region setting module 121 sets a quadrangular designated region, by extracting a minimum value (X_LEFT) and a maximum value (X_RIGHT) on an X-axis within a running path, and a minimum value (Y_BOTTOM) and a maximum value (Y_TOP) on a Y-axis.

Figure 10A:
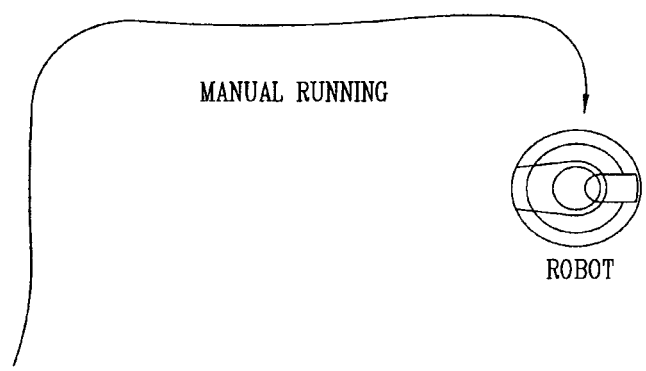
FIGS. 10A to 10E are views illustrating another example of an operation to set a designated region according to preferred embodiments of the present invention.
Figure 10B:
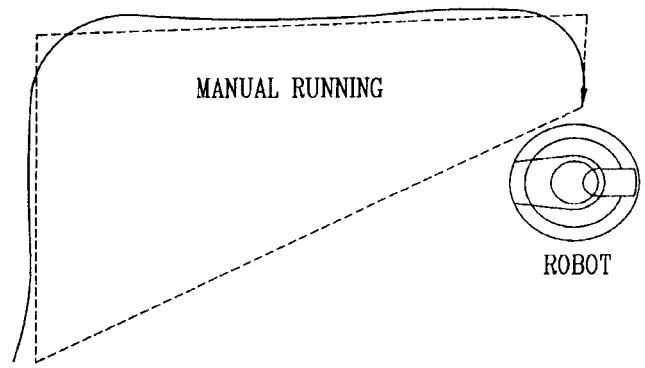
Figure 10C:
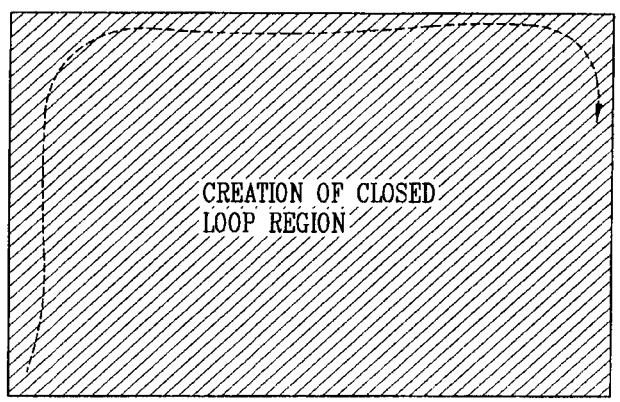
Figure 10D:
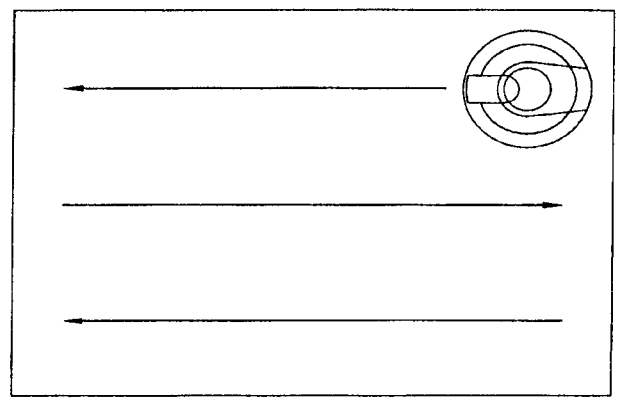
Figure 10E:
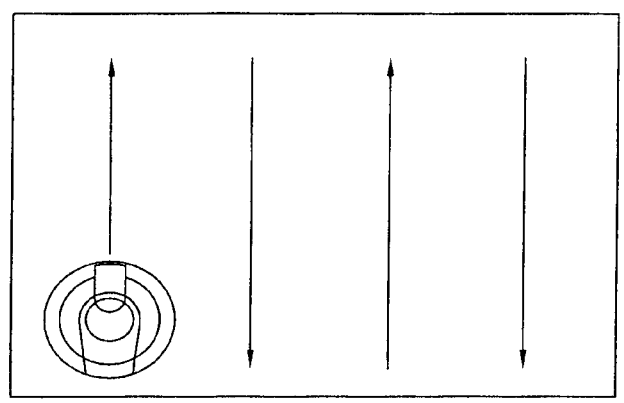

FIGS. 10A to 10E and 11 are views illustrating another example to set a designated region, in which a running path of the robot cleaner is not implemented as a closed loop. If a user presses the directional button to drive the robot cleaner in a manual manner, the robot cleaner sets a running path as shown in FIG. 10A. Referring to FIG. 10B, the region setting module 121 approximates a running path according to a designated region setting command input by the user. Referring to FIG. 10C, the region setting module 121 may set a rectangular designated region, using maximum values and minimum values in a vertical direction and a horizontal direction of the running path. Then the control unit performs a cleaning operation with respect to the designated region. That is, if a user presses the start button 215 of the terminal device shown in FIG. 7 after a designated region is set, the control unit performs a cleaning operation with respect to the set designated region as shown in FIGS. 10D and 10E.

Figure 11:
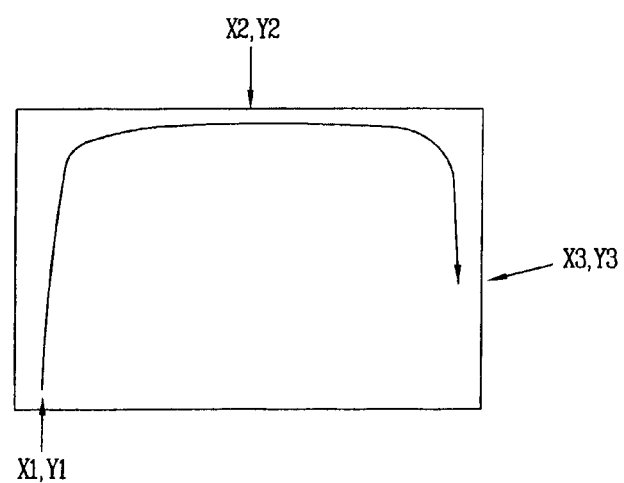
FIG. 11 is a view illustrating an operation to create a rectangular closed loop shown in FIGS. 10A to 10E.

FIG. 11 is a view illustrating another example to set a designated region of a quadrangular shape. As shown in FIG. 11, the region setting module 121 sets a quadrangular designated region, by extracting a minimum value (X_LEFT) and a maximum value (X_RIGHT) on an X-axis within a running path, and a minimum value (Y_BOTTOM) and a maximum value (Y_TOP) on a Y-axis. Referring to FIG. 11, X_LEFT is 'X1', X_RIGHT is 'X3', Y_BOTTOM is 'Y1', and Y_TOP is 'Y2'.

Figure 12:
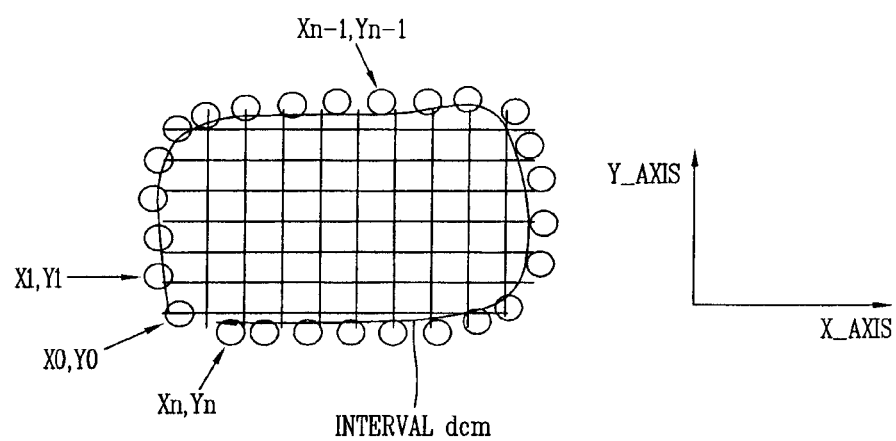
FIGS. 12 and 13 are views illustrating still another example of an operation to set a designated region according to preferred embodiments of the present invention.

FIG. 12 is a view illustrating still another example to set a designated region in an approximation manner. That is, the region setting module 121 stores a polygonal designated region, using positions from a start position (X0,Y0) to an end position (Xn, Yn). The region setting module 121 sets a designated region, by moving a closed loop region toward an X-axis direction and a Y-axis direction, by an arbitrary value (e.g., 10 cm), and then by storing the moved position. The region setting module 121 calculates a long axis and a short axis by comparing a length of the X-axis, with a length of the Y-axis.

Figure 13:
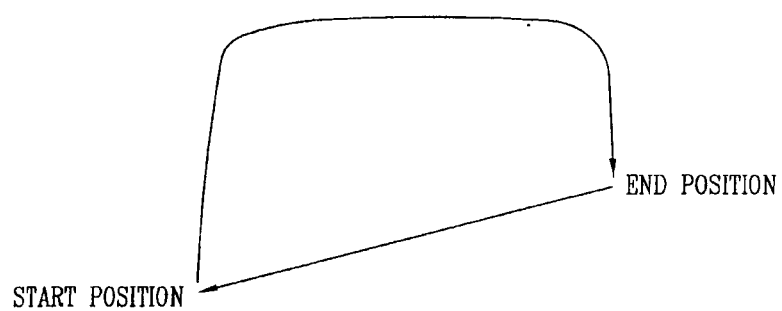

Referring to FIG. 13, even in a case where a running path implemented according to a user's designated region setting command is not a closed loop, the region setting module 121 may set a designated region by simply connecting a start position and an end position on the running path with each other, unlike in FIG. 11.

Figure 4:
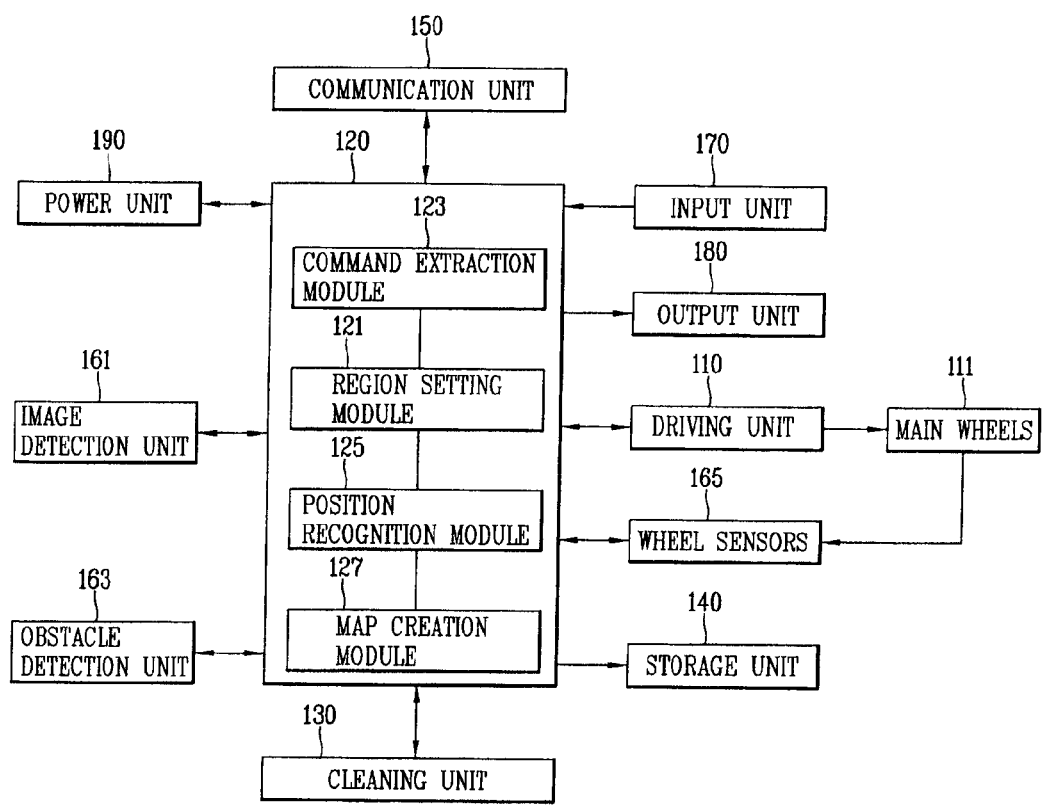

Referring to FIG. 4, the robot cleaner may further comprise an image detection unit 161 configured to detect image information by capturing a peripheral space of the robot cleaner. The image detection unit 161 may be provided with an upper camera sensor installed toward the upper side or the front side. If the image detection unit 161 is provided with a plurality of upper camera sensors, the camera sensors may be formed on the upper surface or the side surface of the robot cleaner, at constant intervals or at constant angles. The image detection unit 161 may further comprise a camera, a lens connected to the camera and focusing the camera on the subject, a camera control unit configured to control the camera, and a lens control unit configured to control the lens. As the lens, preferably used is a lens having a wide view angle so that all the peripheral regions, e.g., all the regions on the ceiling may be captured at a predetermined position. The control unit 120 may further comprise a position recognition module 125 configured to recognize a position of the robot cleaner using image information. The position recognition module 125 may extract feature points from image information captured by the image detection unit 161, thereby recognizing a position of the robot cleaner based on the feature points. The control unit 120 may further comprise a map creation module 127 configured to create a map with respect to a cleaning region using image information, based on the position of the robot cleaner recognized by the position recognition module 125.

Referring to FIG. 4 back, the robot cleaner further comprises an obstacle detection unit 163 having one or more sensors, and configured to detect peripheral obstacles using detection signals of the sensors, and to output obstacle information. The position recognition module 125 recognizes a position of the robot cleaner using obstacle information rather than image information, or using both of the image information and the obstacle information. The map creation module 127 may create a map with respect to a cleaning region, using obstacle information rather than image information, or using both of the image information and the obstacle information, based on the position of the robot cleaner recognized by the position recognition module 125.

As shown in FIG. 1, the obstacle detection unit 163 comprises first sensors 163a installed on an outer circumferential surface of the robot cleaner at constant intervals. The obstacle detection unit 163 may also comprise second sensors protruding towards outside of the body. Positions and types of the first sensors and the second sensors may be variable according to a type of the robot cleaner, and the obstacle detection unit may comprise various types of sensors. The first sensors 163a are configured to detect an object which exists in a moving direction of the robot cleaner, i.e. an obstacle, and then transmits obstacle information to the control unit 120. That is, the first sensors detect protrusions, appliances, furniture, wall surfaces, wall corners, etc. which exist on a moving path of the robot cleaner, and then transmits obstacle information to the control unit 120. The first sensor may be implemented as an infrared ray sensor, an ultrasonic sensor, an RF sensor, a geomagnetic sensor, etc. The second sensors detect an obstacle which exists at the front or lateral side, and transmits obstacle information to the control unit 120. That is, the second sensors detect protrusions, appliances, furniture, wall surfaces, wall corners, etc. which exist on a moving path of the robot cleaner, and then transmit obstacle information to the control unit 120. The second sensor may be implemented as an infrared ray sensor, an ultrasonic sensor, an RF sensor, a position sensitive device (PSD) sensor, etc.

The obstacle detection unit 163 may further comprise a cliff sensor installed at the bottom surface of the body, and configured to detect an obstacle which is on the floor, e.g., a cliff. The cliff sensor is configured to obtain stable measurement values regardless of reflectivity of the floor and a color difference. Like the PSD sensor, the cliff sensor may be implemented in the form of an infrared ray module.

The obstacle detection unit 163 may further comprise a charging signal sensor (not shown) for receiving a guide signal transmitted from a charging station. The robot cleaner receives a guide signal transmitted from the charging station using the charging signals sensor, thereby checking a position and a direction of the charging station. The charging station creates a guide signal indicating a direction and a distance so that the robot cleaner can return to the charging station. The robot cleaner receives the guide signal transmitted from the charging station, and determines the current position and sets a moving direction. Then the robot cleaner returns to the charging station. The charging signal sensor may be implemented as an infrared ray sensor, an ultrasonic sensor, a radio frequency (RF) sensor, etc, and may be generally used as an infrared ray sensor.

The robot cleaner may further comprise wheel sensors 165 connected to right and left main wheels 111, and sensing RPMs of the right and left main wheels 111. The wheel sensors 165 may be implemented as a rotary encoder. When the robot cleaner moves in a running mode or a cleaning mode, the rotary encoder senses RPMs of the right and left main wheels, and outputs the sensed RPMs. The control unit 120 may calculate rotation speeds of the right and left main wheels based on the sensed RPMs.

The robot cleaner may further comprise an input unit 170 through which a user directly inputs a control command to the robot cleaner. The user may input, through the input unit 170, a command instructing output of one or more information among information stored in a storage unit 140. The input unit 170 may be implemented as one or more buttons. For instance, the input unit 170 may comprise an OK button and a set button. The OK button is used to input a command for checking obstacle information, position information, image information, a cleaning region, a cleaning map, etc. The set button is used to input a command for setting such information. The input unit may be provided with a reset button for inputting a command for resetting such information, a deletion button, a cleaning start button, a stop button, etc. As another example, the input unit 170 may be provided with a button for setting reservation information, or a button for deleting reservation information. The input unit 170 may be further provided with a button for setting a cleaning mode, or a button for changing a cleaning mode. The input unit 170 may be further provided with a button for inputting a command instructing the robot cleaner to return to a charging station. As shown in FIG. 1, the input unit 170 may be installed at an upper part of the robot cleaner, in the form of hard or soft keys, a touch pad, etc. The input unit 170 may be implemented in the form of a touch screen together with an output unit.

Referring to FIG. 4 back, the robot cleaner may further comprise an output unit 180. As shown in FIG. 1, the output unit 180 is installed at an upper part of the robot cleaner. In this case, an installation position or an installation type may be variable. For instance, the output unit 180 outputs, to a screen, reservation information, a battery state, intensive cleaning, space extension, a cleaning or running operation in a zigzag form, a cleaning operation with respect to a designated region, etc. The output unit 180 may output the current cleaning state of the robot cleaner, and the current state of each unit of the robot cleaner. The output unit 180 may display, on the screen, obstacle information, position information, image information, a cleaning map, a cleaning region, a designated region, etc. The output unit 180 may be implemented as one of a light emitting diode (LED), a liquid crystal display (LCD), a plasma display panel (PDP), and an organic light emitting diode (OLED).

Referring to FIG. 4, the robot cleaner may further comprise a power unit 190. The power unit 190 is provided with a chargeable battery to supply power into the robot cleaner. The power unit 190 supplies, to each unit, a driving power and an operation power required when the robot cleaner moves or when the robot cleaner performs a cleaning operation. When the remaining amount of power is deficient, the robot cleaner moves to a charging station to be supplied with a charging current. The robot cleaner further includes a battery sensing unit (not shown) configured to sense a charged state of a battery, and to transmit detection information to the control unit 120. As the battery is connected to the battery sensing unit, the remaining amount and a charged state of the battery are transmitted to the control unit 120. The remaining amount of battery power may be displayed on the screen of the output unit.

Figure 14:
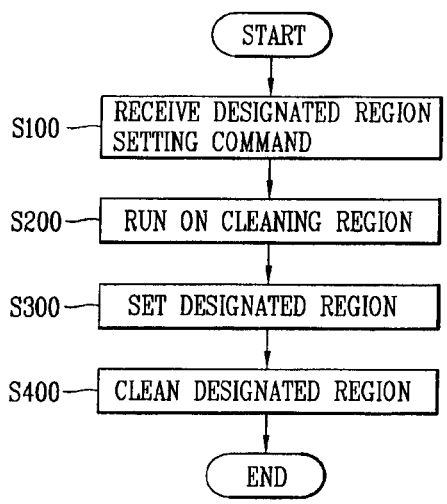
FIGS. 14 to 16 are flowcharts schematically illustrating a method for controlling a robot cleaner according to preferred embodiments of the present invention.

Referring to FIG. 14, a method for controlling a robot cleaner according to an embodiment of the present invention comprises receiving a designated region setting command (S100), running on a cleaning region according to the designated region setting command (S200), setting a designated region within the cleaning region (S300), and performing a cleaning operation with respect to the designated region (S400). Explanations about the components will be performed with reference to FIGS. 1 to 7.

The robot cleaner receives a designated region setting command, from the input unit or an external terminal device (S100). The robot cleaner drives the driving unit according to the designated region setting command, thereby setting a designated region within a cleaning region (S300). More specifically, once a user inputs a designated region setting command to the robot cleaner (S100), the robot cleaner runs on a cleaning region, according to the designated region setting command (S200). Then the robot cleaner sets a designated region based on a running path (S300). The designated region setting command comprises a designated region setting start command, a designated region setting completion command, a running command for setting a designated region, etc.

The robot cleaner performs a cleaning operation with respect to a designated region according to a cleaning command (S400). That is, once a cleaning command is input, the robot cleaner starts to perform a cleaning operation with respect to a cleaning region or a designated region, using the cleaning unit such as the suction fan and the suction motor. The cleaning command comprises a cleaning start command, a cleaning stop command, etc. The cleaning command further comprises one or more information among a cleaning type, the number of times of cleaning, whether to repeatedly perform a cleaning operation or not, and a cleaning start time.

Figure 15:
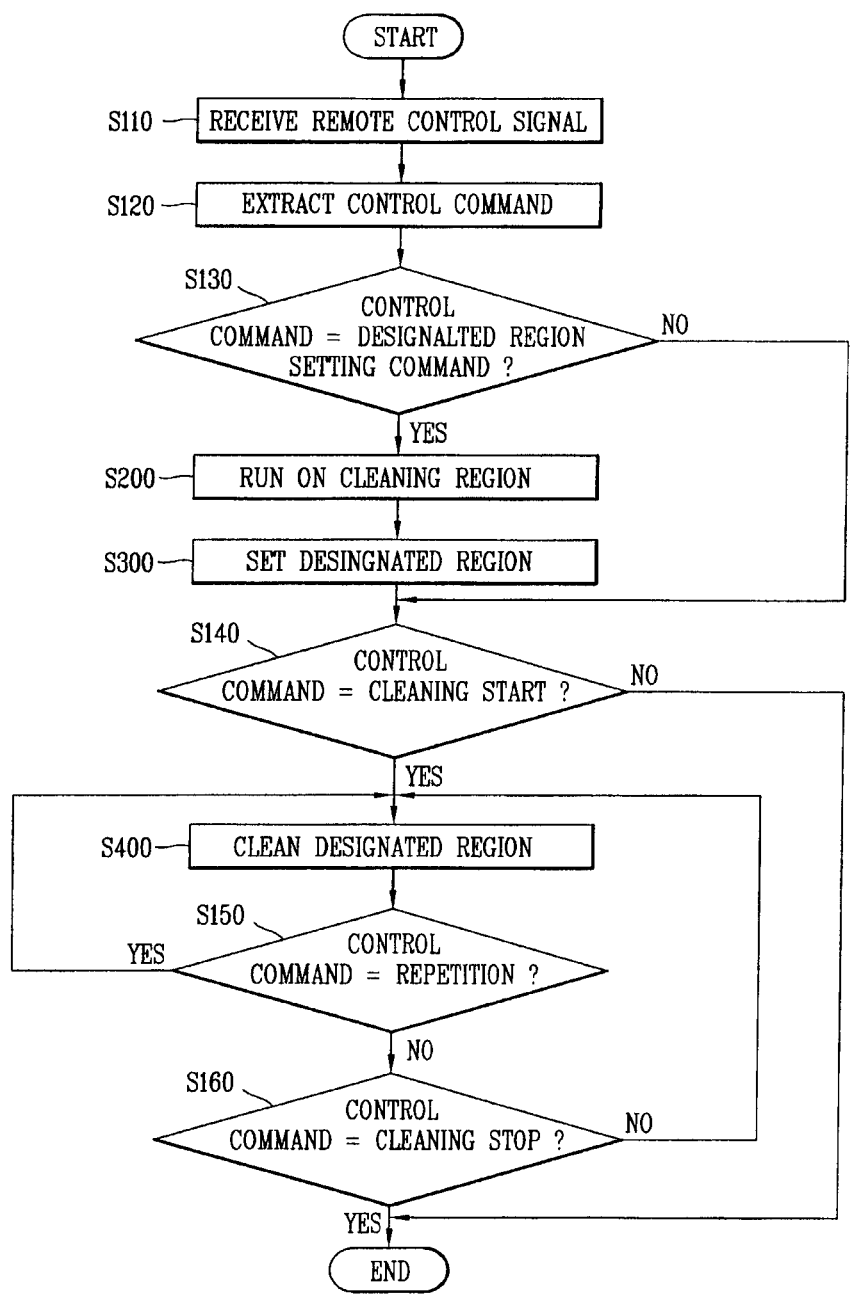

Referring to FIG. 15, a method for controlling a robot cleaner according to another embodiment of the present invention comprises: receiving a remote control signal from an external device (S110); extracting, from the remote control signal, a control command including a designated region setting command and a cleaning command (S120); receiving a designated region setting command (S130); running on a cleaning region according to the designated region setting command (S200); setting a designated region within the cleaning region (S300); and performing a cleaning operation with respect to the designated region, according to a cleaning command (S400). Explanations about the components will be performed with reference to FIGS. 3 to 7.

The robot cleaner receives a remote control signal from an external terminal device (S110), and transmits a response signal to the remote control signal, i.e., one or more data, to the external terminal device. For instance, in a case where a user wishes to perform a cleaning operation with respect to a designated region by pressing the designated region button, the terminal device generates a remote control signal according to a designated region setting command, and transmits the generated remote control signal to the robot cleaner. Then the robot cleaner receives the remote control signal using the communication unit (S110). Then the robot cleaner extracts the designated region setting command, from the remote control signal (S120). The robot cleaner may delete information on a cleaning type and a cleaning region, by resetting the memory mounted therein. The robot cleaner may backup information prior to execution of the designated region setting command.

If an extracted control command is a designated region setting command, the robot cleaner runs on a cleaning region according to the designated region setting command (S200), and sets a designated region based on a running path (S300). For instance, if a user presses the designated region button of FIG. 7, the terminal device converts a designated region setting command into a remote control signal. Then the terminal device transmits the remote control signal to the robot cleaner. The robot cleaner stops the current command according to the designated region setting command. Then if the user presses the directional button, the robot cleaner runs using the driving unit, and generates a running path (S200). Hereinafter, an operation to set a designated region and perform a cleaning operation by the robot cleaner, will be explained with reference to FIGS. 8A to 13.

FIGS. 8A to 8E and 9 are views illustrating an example to set a designated region, in which a running path of the robot cleaner is implemented as a closed loop. If a user presses the directional button to drive the robot cleaner in a manual manner, the robot cleaner sets a running path as shown in FIG. 8A (S200). Referring to FIG. 8B, the robot cleaner approximates a running path according to a designated region setting command input by the user. Referring to FIG. 8C, the robot cleaner may set a rectangular designated region, using maximum values and minimum values in a vertical direction and a horizontal direction of the running path (S300). Then the robot cleaner performs a cleaning operation with respect to the designated region (S400). That is, if a user presses the start button of the terminal device shown in FIG. 7 after a designated region is set, the terminal device transmits, to the robot cleaner, a remote control signal according to a cleaning start command (S110). If the remote control signal is a cleaning start command (S140), the robot cleaner performs a cleaning operation with respect to the set designated region as shown in FIGS. 8D and 8E (S400). Preferably, the robot cleaner moves in a width corresponding to its radius. FIGS. 8D and 8E illustrate an example of a cleaning type. The robot cleaner may adopt a random type, a spiral type, and so on, as well as a zigzag type. In case of the zigzag type, the robot cleaner may firstly perform a zigzag cleaning in a horizontal direction (long-axis) within a closed loop as shown in FIG. 8D. Then the robot cleaner may perform a zigzag cleaning in a vertical direction (short-axis) as shown in FIG. 8E. However, the robot cleaner may perform a zigzag cleaning in other manner. If an extracted control command is a repetition command, e.g., if a repetition button of the terminal device is pressed (S150), the robot cleaner may repeatedly perform a cleaning operation with respect to a designated region. Alternatively, if an extracted control command is a cleaning stop command (S160), the robot cleaner may immediately stop a cleaning operation with respect to a designated region.

FIG. 9 is a view illustrating an example to set a designated region of a quadrangular shape. As shown in FIG. 9, the robot cleaner sets a quadrangular designated region, by extracting a minimum value (X_LEFT) and a maximum value (X_RIGHT) on an X-axis within a running path, and a minimum value (Y_BOTTOM) and a maximum value (Y_TOP) on a Y-axis.

FIGS. 10A to 10E and 11 are views illustrating another example to set a designated region, in which a running path of the robot cleaner is not implemented as a closed loop. If a user presses the directional button to drive the robot cleaner in a manual manner (S200), the robot cleaner sets a running path as shown in FIG. 10A (S300). Referring to FIG. 10B, the robot cleaner approximates a running path according to a designated region setting command input by the user. Referring to FIG. 10C, the robot cleaner may set a rectangular designated region, using maximum values and minimum values in a vertical direction and a horizontal direction within the running path. Then the robot cleaner performs a cleaning operation with respect to the designated region (S400). That is, if a user presses the start button of the terminal device shown in FIG. 7 after a designated region is set, the robot cleaner performs a cleaning operation with respect to the set designated region as shown in FIGS. 10D and 10E (S400).

FIG. 11 is a view illustrating another example to set a designated region of a quadrangular shape. As shown in FIG. 11, the region setting module 121 sets a quadrangular designated region, by extracting a minimum value (X_LEFT) and a maximum value (X_RIGHT) on an X-axis within a running path, and a minimum value (Y_BOTTOM) and a maximum value (Y_TOP) on a Y-axis. Referring to FIG. 11, X_LEFT is 'X1', X_RIGHT is 'X3', Y_BOTTOM is 'Y1', and Y_TOP is 'Y2'.

FIG. 12 is a view illustrating still another example to set a designated region in an approximation manner. That is, the robot cleaner stores a polygonal designated region, using positions from a start position (X0, Y0) to an end position (Xn, Yn). The robot cleaner sets a designated region, by moving a closed loop region toward an X-axis direction and a Y-axis direction, by an arbitrary value (e.g., 10 cm), and then by storing the moved position. The robot cleaner calculates a long axis and a short axis by comparing a length of the X-axis, with a length of the Y-axis.

Referring to FIG. 13, even in a case where a running path implemented according to a user's designated region setting command is not a closed loop, the robot cleaner may set a designated region by simply connecting a start position and an end position on the running path with each other, unlike in FIG. 11.

Figure 16:
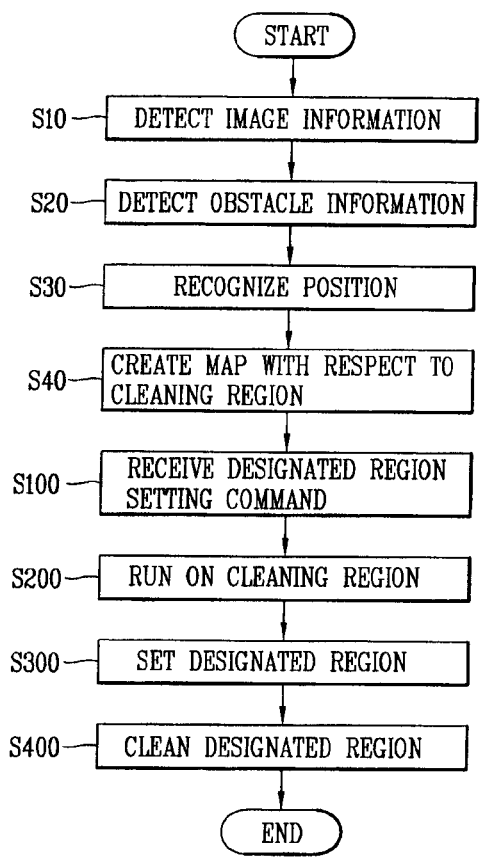

Referring to FIG. 16, the robot cleaner may detect image information by capturing a peripheral space using the image detection unit (S10). The robot cleaner may recognize its position based on the image information (S30). The robot cleaner may extract feature points from the image information, and may recognize its position based on the extracted feature points. The robot cleaner may create a map with respect to a cleaning region, based on the image information and the position information (S40). The designated region may be displayed on the map with respect to a cleaning region.

Referring to FIG. 16, the robot cleaner may detect an obstacle within a cleaning region, based on a signal sensed by the obstacle detection unit (S20). The robot cleaner recognizes its position using obstacle information rather than image information, or using both of the image information and the obstacle information (S30). The robot cleaner may create a map with respect to a cleaning region, using obstacle information rather than image information, or using both of the image information and the obstacle information, based on the recognized position (S40).

As aforementioned, the present invention can have the following advantages.

Firstly, as the robot cleaner runs on a user's desired region in a manual manner, a designated region can be precisely set. The designated region can be cleaned in a repeated and concentrated manner.

Further, as the robot cleaner performs a cleaning operation by setting a user's desired region, only a simple configuration is added to a terminal device such as a remote control unit. Accordingly, additional costs can be reduced, and a malfunction can be prevented.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A autonomous robot, comprising:
   a driving unit configured to move the autonomous robot; and
   a control unit comprising a region setting module configured to set a designated region within a cleaning region according to a designated region setting command inputted by a user, and configured to perform a cleaning operation with respect to the designated region according to a cleaning command, the designated region setting command being transmitted from a terminal device that is separated from the autonomous robot,
   wherein the designated region is formed based on a running path of the autonomous robot, the running path being generated based on sequential changing moving directions of the running autonomous robot according to a user input.

2. The autonomous robot of claim 1, wherein the control unit stops performing a current command upon receiving the designated region setting command, and then sets the designated region according to a user input.

3. The autonomous robot of claim 2, wherein the current command is to perform a cleaning operation with respect to the cleaning region or the designated region.

4. The autonomous robot of claim 2, wherein the control unit performs the cleaning operation with respect to the designated region after forming the designated region.

5. The autonomous robot of claim 1, wherein the region setting module sets the designated region into a rectangular shape, using maximum values and minimum values in a vertical direction and a horizontal direction of the running path.

6. The autonomous robot of claim 1, wherein the region setting module sets the designated region by connecting a start position and an end position on the running path with each other when the running path according to the designated region setting command is not a closed loop.

7. The autonomous robot of claim 1, wherein the region setting module sets the designated region into a polygonal shape by approximating the running path.

8. The autonomous robot of claim 1, further comprising a communication unit configured to receive a remote control signal from an external device, wherein the control unit further comprises a command extraction module configured to extract, from the remote control signal, a control command including the designated region setting command.

9. The autonomous robot of claim 1, wherein the cleaning command comprises one or more among a cleaning type, the number of times of cleaning, whether to repeatedly perform a cleaning operation or not, and a cleaning start time.

10. A autonomous robot system, comprising:
a autonomous robot provided with a designated region cleaning mode, and configured to set a designated region within a cleaning region according to a designated region setting command inputted by a user, and to perform a cleaning operation with respect to the designated region according to a cleaning command; and
a terminal device separated from the autonomous robot, and configured to receive the designated region setting command corresponding to the designated region cleaning mode or the cleaning command with respect to the designated region, and then transmit the command to the autonomous robot,
wherein the designated region is formed based on a running path of the autonomous robot, the running path being generated based on sequential changing moving directions of the running autonomous robot according to the user input.

11. The autonomous robot system of claim 10, wherein the autonomous robot stops performing a current command upon receiving the designated region setting command, and then sets the designated region according to a user input.

12. The autonomous robot system of claim 11, wherein the current command is to perform a cleaning operation with respect to the cleaning region or the designated region.

13. The autonomous robot system of claim 11, wherein the autonomous robot performs the cleaning operation with respect to the designated region after forming the designated region.

14. The autonomous robot system of claim 10, wherein the terminal device comprises an input unit configured to receive the designated region setting command and the cleaning command,
wherein the input unit comprises:
a designated region button for making the autonomous robot enter the designated region cleaning mode; and
one or more directional buttons for driving the autonomous robot such that the autonomous robot sets the designated region.

15. A method for controlling a autonomous robot, comprising:
receiving a designated region setting command transmitted from a terminal device that is separated from the autonomous robot;
generating a running path based on a path of sequential changing moving directions of the running autonomous robot according to a user input;
setting a designated region within a cleaning region, wherein the designated region is formed based on the running path of the autonomous robot; and
performing a cleaning operation with respect to the designated region according to a cleaning command.

16. The method of claim 15, further comprising stopping performing a current command after the step of receiving a designated region setting command.

17. The method of claim 16, wherein the current command is to perform a cleaning operation with respect to the cleaning region or the designated region.

18. The method of claim 15, wherein in the step of setting a designated region, the designated region is set into a rectangular shape using maximum values and minimum values in a vertical direction and a horizontal direction of the running path.

19. The method of claim 15, wherein in the step of setting a designated region, the designated region is set by connecting a start position and an end position on the running path with each other when the running path according to the designated region setting command is not a closed loop.

20. The method of claim 15, wherein in the step of setting a designated region, the designated region is set into a polygonal shape by approximating the running path.

* * * * *